Sept. 21, 1948.    R. CADWALLADER    2,449,875
MOUNTING STRUCTURE FOR WINDOWS
Filed June 30, 1944    2 Sheets-Sheet 1
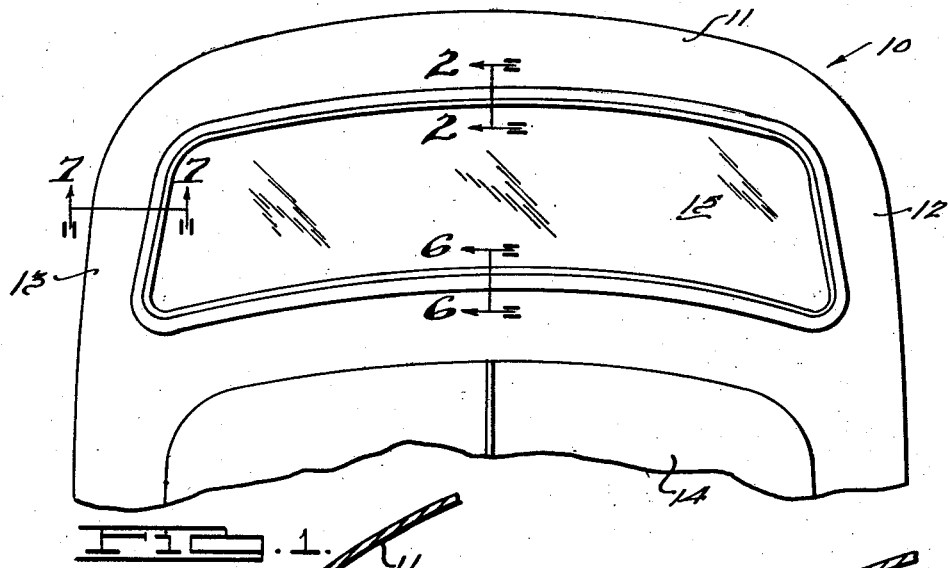
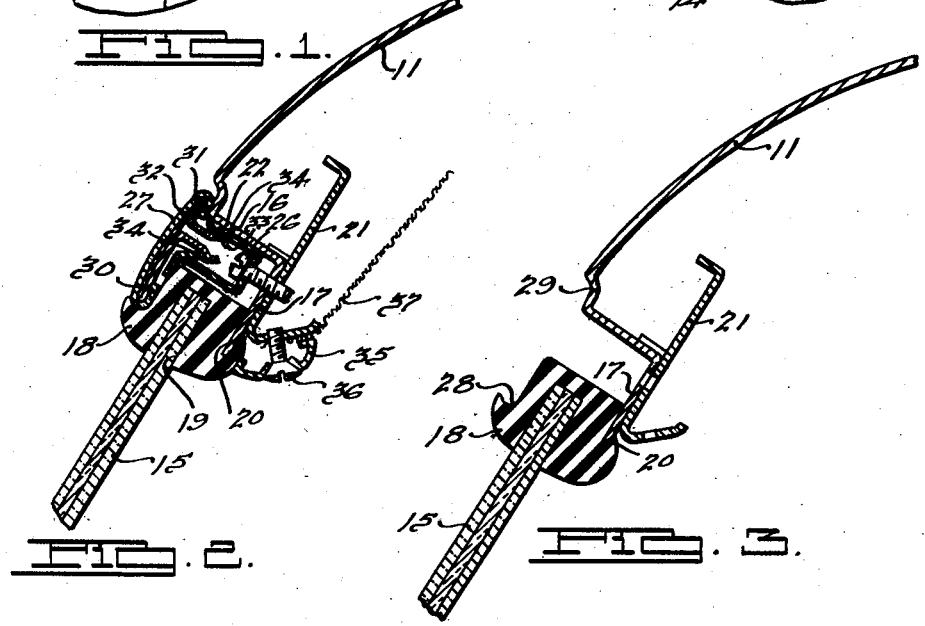
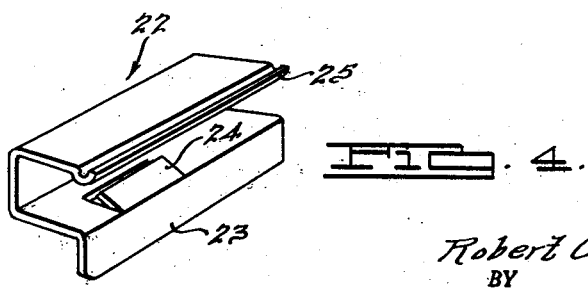
INVENTOR.
Robert Cadwallader
BY
Harness and Harris
ATTORNEYS.

Sept. 21, 1948. R. CADWALLADER 2,449,875
MOUNTING STRUCTURE FOR WINDOWS
Filed June 30, 1944 2 Sheets-Sheet 2
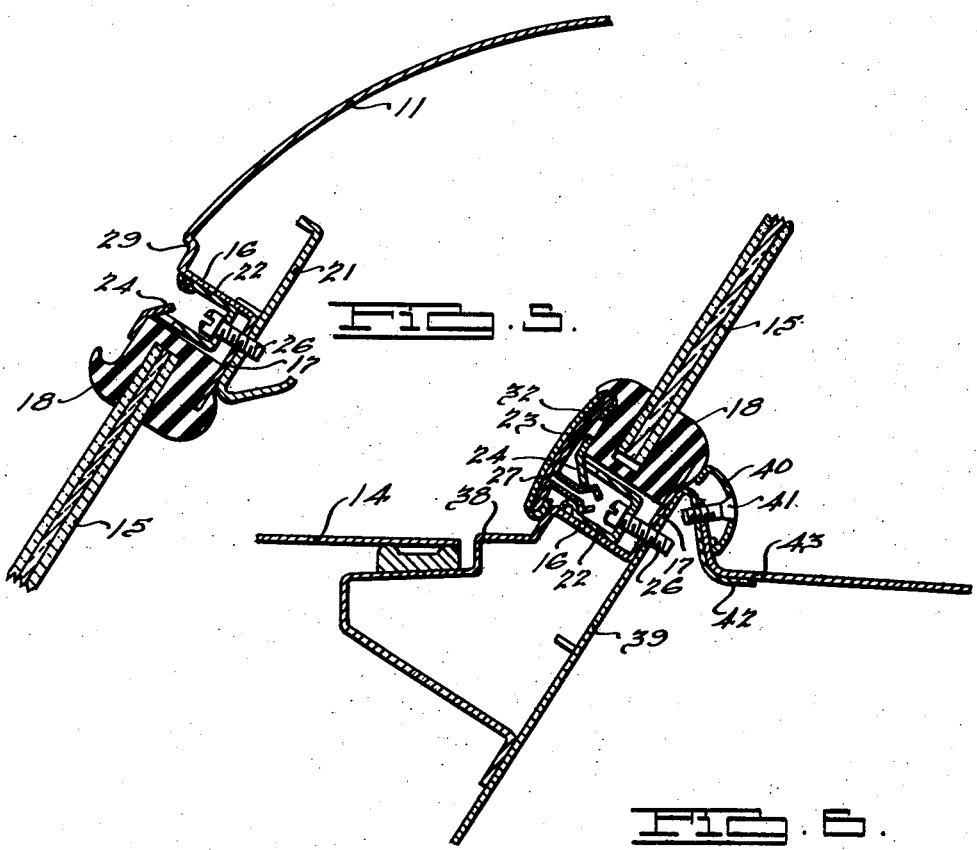
FIG. 5.
FIG. 6.
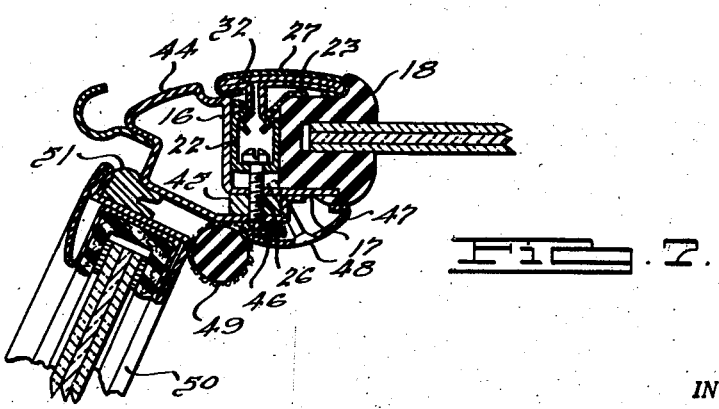
FIG. 7.
INVENTOR.
Robert Cadwallader
BY
Harness and Harris
ATTORNEYS.

Patented Sept. 21, 1948

2,449,875

UNITED STATES PATENT OFFICE 2,449,875

MOUNTING STRUCTURE FOR WINDOWS

Robert Cadwallader, Detroit, Mich., assignor to Chrysler Corporation, Highland Park, Mich., a corporation of Delaware Application June 30, 1944, Serial No. 542,980

13 Claims. (Cl. 296—84)

This application relates to a mounting for a window in an opening of a housing. More specifically it relates to a mounting for a windshield in a vehicle.

Generally windshields of automobiles are installed from the inside. This makes installation difficult and costly, for it is difficult for one or more workmen to put a windshield in place while sitting in a partially completed automobile, and it is costly in view of the length of time required for the tedious inside installation.

I propose to install a windshield from the outside of an automobile and thereby to reduce the costs and trouble of installation. Accordingly, I have invented a mounting structure that makes such installation feasible.

An object of the present invention is to provide an improved construction involving a housing and a window therefor. The housing may be a vehicle such as an automobile, and the window, a windshield.

A further object is to provide an improved mounting structure for a window in a housing, which structure makes possible the installation of the window from the outside of the housing. This improved mounting structure is advantageously applied for supporting a windshield in a vehicle such as an automobile.

Other objects will appear from the disclosure.

In the drawings:

Fig. 1 is a front view of part of an automobile showing the windshield and its mounting;

Fig. 2 is a sectional view taken on the line 2—2 of Fig. 1;

Fig. 3 is a sectional view taken on the same line as that of Fig. 2 but with parts removed;

Fig. 4 is a perspective view of a fastening means employed in the present invention;

Fig. 5 is a sectional view taken on the same line as Fig. 2 but with certain parts removed;

Fig. 6 is a sectional view taken on the line 6—6 of Fig. 1; and

Fig. 7 is a sectional view taken on the line 7—7 of Fig. 1.

Reference character 10 designates an automobile body comprising a top 11, sides 12 and 13, and a hood 14. A windshield 15 is mounted in an opening in the front of the vehicle body 10. As seen in Fig. 2, the opening receiving the windshield 15 has a flange composed of a first portion 16 extending inwardly of the body or vehicle and a second portion 17 extending from the first portion 16 at right angles thereto radially inwardly of the opening. Windshield 15 may be of the usual safety construction formed of three layers. A sealing ring 18 formed of rubber or other suitable material has a radially inwardly directed groove 19 receiving the edge of the windshield 15 and a radially outwardly directed groove 20 spaced inwardly of the vehicle from the groove 19 and receiving the flange portion 17. A flanged stiffener member 21 is located at the inner side of the flange portion 17 in contact therewith. The seal 18 is spaced from the flange portion 16 and in the space is positioned a plurality of channels 22. As best seen in Fig. 4, each channel has an outwardly extending flange or tab 23 at one side, an inwardly directed projection 24 formed from a struck-out portion at the same side, and an inwardly directed projection 25 at the other side formed of a bead pressed in that side. Each channel 22 has one or more openings in its base through which one or more screws 26 extend into threaded engagement with the flange portion 17 and the reinforcing member 21, the head of the screws engaging the base of the channel 22. The tab or lip 23 on each channel engages the outer side of the sealing ring 18, and thus the channels and the screws secure the sealing ring against the flange portion 17 and hold the window 15 in place. A protective strip 27 overlaps the sealing strip 18 and the region of the vehicle body outward of the flange portion 16. A recess 28 in the sealing strip 18 and a recess 29 formed in the vehicle receive the strip 27, which has bent-back edges 30 and 31 directed toward one another and resting in the recesses 28 and 29. A plurality of formed members 32 is clamped in spaced relation between the edges 30 and 31 of the covering strip 27 and the body portion thereof. Each member 32 has two spring fingers 33 projecting into detachable engagement with the struck-out portion 24 and the body 25 of a channel 22. The spring fingers 33 have outwardly directed regions 34 engaging the struck-out portion 24 and the body 25. As is seen in Fig. 1 covering strip 27 is in the form of a ring extending all the way around the windshield 15.

Figs. 2, 3, and 5 illustrate the steps in installing the windshield 15. First, as seen in Fig. 3, the windshield is installed from the outside of the vehicle with the flange portion 17 engaging the groove 20 formed in the sealing strip 18. Then as seen in Fig. 5, channels 22 are applied at spaced intervals about the windshield in the space between the sealing ring 18 and the flange portion 16, and the screws 26 are applied from the outside through the bases of the channels into threaded engagement with the flange portion 17 and the reinforcing member 21. Thereafter a sealing compound is applied between the sealing ring 18 and the flange portion 16 as far out as the base of the channels 22. Alternatively, the sealing compound may be applied before installation of the channels 22 and the screws 26, and in this event the location of the holes in the reinforcing member 21 and the flange portion 17 for the screws 26 is marked on the flange portion 16. Thereafter the covering strip or ring 27 is applied, the spring fingers 33 snapping into engagement with the inwardly directed projections 24 and 25 on the channels 22.

A molding strip 35 may be secured against the inner side of the sealing ring 18 and against a flange on the reinforcing member 21 by means of one or more screws 36. A cloth lining piece 37 is secured between the molding strip 35 and the flange on the reinforcing member 21, the cloth member 37 serving to line the inside of the top 11.

Fig. 6 shows the securement of the lower side of the windshield 15 to the vehicle. The hood 14 is supported at its rear end upon a portion 38 of the body, which completes the opening for the windshield 15 along with the top 11 and the sides 12 and 13. As formed on the top 11 at the opening for the windshield 15, the portion 38 has a flange having a portion 16 extending inwardly of the vehicle and a portion 17 extending from the portion 16 at right angles thereto radially inwardly of the opening for the windshield. The flange portion 17 rests against a sloping member 39 forming the division piece between the engine compartment and the driver's compartment. As in the case of the parts described with reference to Fig. 2, the lower side of the sealing ring 18 and the flange portion 16 have a space between them in which are located a plurality of channels 22 which are secured to the flange portion 17 and the member 39 by means of screws 26 installed from the outside. The lower side of the covering strip or ring 27 is detachably connected to the channels 22, spring fingers 33 on formed members 32 clamped within the lower side of the covering ring engaging beads 25 and struck-out portions 24 on the channels 22. The lip or tabs 23 engage the lower side of the sealing ring 18 holding it against the flange portion 17. The molding strip 40 secured by one or more screws 41 to a flange 42 on the member 39 engages the inner lower side of the sealing ring 18 and holds a horizontal part 43 against the flange 42.

As seen in Fig. 7 the sides 12 and 13 each include an A post 44 formed of sheet metal, bent to shape and clamping between certain adjacent portions, a spacer 45 having threaded openings adapted to receive screws 26. In this case the flange at the side of the opening for the windshield 15 has a portion 16 extending inwardly of the vehicle and a portion 17 extending from the portion 16 at right angles thereto radially inwardly of the opening, both flange portions being part of the sheet metal A post 44. Channels 22 are secured by screws 26 to the A post 44, the screws being in threaded engagement with the flange portion 17, the spacer 45, and a portion 46 of the A post held in spaced relation to the flange portion 17 by the spacer 45. Tabs or lips 23 on the channels 22 hold the sides of the sealing ring 18 against the flange portion 17. The sides of the covering strip or ring 27 are detachably connected to the channels 22 by the means of formed members 32 having spring fingers 33 engaging inwardly directed projections 24 and 25 on the channels. A molding strip 47 is secured to the A post 44 by means of one or more screws 48. The molding strip is held firmly against the inner edge of the side of the sealing ring 18 and clamps a windlace 49 against the A post 44. The windlace 49 provides a seal for the inner front edge of a front door 50 which has an outer front edge to which is secured a seal 51 engageable with the A post 44.

It will be apparent from the foregoing description that a new and novel construction has been provided for mounting a window from the outside. This is of special value when applied to automobiles for it is costly and difficult to install units such as windshields from the inside of cars.

I claim:

1. The combination with a vehicle and a windshield therefor, of means for installing the windshield in an opening in the vehicle from the outside of the vehicle, said means comprising a flange on the opening having a first portion extending inwardly of the vehicle and a second portion extending radially inwardly of the opening from the first portion, a sealing ring having a radially inwardly facing groove engaging the periphery of the windshield and a radially outwardly facing groove displaced inwardly of the vehicle from the aforesaid groove and engaging the radially inwardly extending portion of the flange on the opening in the vehicle and being spaced from the first portion of the flange over a region extending from the outer side of the vehicle inwardly of the vehicle for at least a considerable part of the first portion of the flange, a plurality of channels having an outwardly directed tab on one side and inwardly directed projections at both sides and fitting in spaced relation to one another in the space between the sealing ring and the first portion of the flange with the bases of the channels innermost and the tabs engaging the outer side of the sealing ring, threaded fastenings applicable from the outside of the vehicle through the bases of the channels for securing the channels to the radially inwardly extending portion of the flange on the opening in the vehicle, and a covering ring overlapping the sealing ring and the opening in the vehicle outwardly of the flange and having spaced fastening means at one side detachably engaging the inwardly directed projections on the channels.

2. The combination with an opening in a housing and a window therefor, of means for installing the window in the opening from the outside of the housing, said means comprising a flange on the opening having a first portion extending inwardly of the housing and a second portion extending radially inwardly of the opening from the first portion, a sealing ring engaging the periphery of the window and the second portion of the flange and being spaced from the first portion of the flange, fastening means installable from the outside of the housing in the space between the sealing ring and the first portion of the flange so as to cooperate with the second portion of the flange and the sealing ring in retaining the window in the opening, and a covering ring overlapping the sealing ring and the housing outwardly of the opening and having means extending from one side into detachable engagement with the fastening means.

3. The combination with an opening in a housing and a window therefor, of means for installing the window in the opening from the outside of the housing, said means comprising a flange on the opening having a first portion extending inwardly of the housing and a second portion extending radially inwardly of the opening from the first portion, a sealing ring having a radially inwardly directed groove engaging the periphery of the window and a radially outwardly directed groove engaging the second portion of the flange on the opening in the housing, fastening means installable from the outside of the housing between the sealing ring and the first portion of the flange so as to cooperate with the second portion of the flange and the sealing ring in retaining the window in the opening, and a covering ring overlapping the sealing ring and the housing outwardly of the opening and having means extending from one side into detachable engagement with the fastening means.

4. The combination with an opening in a housing and a window therefor, of means for installing the window in the opening from the outside of the housing, said means comprising a flange on the opening having a first portion extending inwardly of the housing and a second portion extending radially inwardly of the opening from the first portion, a sealing ring engaging the periphery of the window and the second portion of the flange and being spaced from the first portion of the flange, elements positioned in spaced relation in the space between the sealing ring and the first portion of the flange and engaging the outer side of the sealing ring, screws having heads engaging the elements and threaded stems passing through the second portion of the flange so as to be installable from the outside of the housing for cooperating with the elements to secure the sealing ring to the second portion of the flange, and a covering ring overlapping the sealing ring and the housing outwardly of the opening and having means extending from one side into detachable engagement with the elements.

5. The combination with an opening in a housing and a window therefor, of means for installing the window in the opening from the outside of the housing, said means comprising a flange on the opening having a first portion extending inwardly of the housing and a second portion extending radially inwardly of the opening from the first portion, a sealing ring having a radially inwardly directed groove engaging the periphery of the window and a radially outwardly directed groove engaging the second portion of the flange on the opening in the housing, elements positioned in spaced relation in the space between the sealing ring and the first portion of the flange and engaging the outer side of the sealing ring, screws having heads engaging the elements and threaded stems passing through the second portion of the flange so as to be installable from the outside of the housing for cooperating with the elements to secure the sealing ring to the second portion of the flange, and a covering ring overlapping the sealing ring and the housing outwardly of the opening and having means extending from one side into detachable engagement with the elements.

6. The combination with a vehicle and a windshield therefor, of means for installing the windshield in an opening in the vehicle from the outside of the vehicle, said means comprising a flange on the opening having a first portion extending inwardly of the vehicle and a second portion extending radially inwardly of the opening from the first portion, a sealing ring having a radially inwardly facing groove engaging the periphery of the windshield and a radially outwardly facing groove displaced inwardly of the vehicle from the aforesaid groove and engaging the radially inwardly extending portion of the flange on the opening in the vehicle and being spaced from the first portion of the flange over a region extending from the outer side of the vehicle inwardly of the vehicle for at least a considerable part of the first portion of the flange, a plurality of channels having an outwardly directed tab on one side and inwardly directed projections at both sides and fitting in spaced relation to one another in the space between the sealing ring and the first portion of the flange with the bases of the channels innermost and the tabs engaging the outer side of the sealing ring, threaded fastening applicable from the outside of the vehicle through the bases of the channels for securing the channels to the radially inwardly extending portion of the flange on the opening in the vehicle, a covering ring having a body portion and edges bent back so as to extend toward one another and being positioned so as to overlap the sealing ring and the vehicle outwardly of the opening with the bent back edges thereagainst, and spaced holding means fitting under the bent back edges of the covering strip and projecting inwardly of the vehicle into detachable engagement with the inwardly directed projections on the channels.

7. The combination with a vehicle and a windshield therefor, of means for installing the windshield in an opening in the vehicle from the outside of the vehicle, said means comprising a flange on the opening having a first portion extending inwardly of the vehicle and a second portion extending radially inwardly of the opening from the first portion, a sealing ring having a radially inwardly facing groove engaging the periphery of the windshield and a radially outwardly facing groove displaced inwardly of the vehicle from the aforesaid groove and engaging the radially inwardly extending portion of the flange on the opening in the vehicle and being spaced from the first portion of the flange over a region extending from the outer side of the vehicle inwardly of the vehicle for at least a considerable part of the first portion of the flange, a plurality of channels having an outwardly directed tab on one side and inwardly directed projections at both sides and fitting in spaced relation to one another in the space between the sealing ring and the first portion of the flange with the bases of the channels innermost and the tabs engaging the outer side of the sealing ring, threaded fastening applicable from the outside of the vehicle through the bases of the channels for securing the channels to the radially inwardly extending portion of the flange on the opening in the vehicle, a covering ring overlapping the sealing ring and the vehicle outwardly of the opening, and spaced holding means connected to the covering ring and having spring fingers detachably engaging the inwardly directed projections on the channels.

8. The combination with a vehicle and a windshield therefor, of means for installing the windshield in an opening in the vehicle from the outside of the vehicle, said means comprising a flange on the opening having a first portion extending inwardly of the vehicle and a second portion extending radially inwardly of the opening from the first portion, a sealing ring having a radially inwardly facing groove engaging the periphery of the windshield and a radially outwardly facing groove displaced inwardly of the vehicle from the aforesaid groove and engaging the radially inwardly extending portion of the flange on the opening in the vehicle and being spaced from the first portion of the flange over a region extending from the outer side of the vehicle inwardly of the vehicle for at least a considerable part of the first portion of the flange, a plurality of channels having an outwardly directed tab on one side and inwardly directed projections at both sides and fitting in spaced relation to one another in the space between the sealing ring and the first portion of the flange with the bases of the channels innermost and the tabs engaging the outer side of the sealing ring, threaded fastenings applicable from the outside of the vehicle through the bases of the channels for securing the channels to the radially inwardly extending portion of the flange on the opening in the vehicle, a covering ring having a body portion and edges bent back so as to extend toward one another and being positioned so as to overlap the sealing ring and the vehicle outwardly of the opening with the bent back edges thereagainst, and spaced holding means fitting under the bent back edges of the covering strip and having opposed spring fingers provided with outwardly directed regions detachably engaging the inwardly directed projections on the channels.

9. The combination with a vehicle and a windshield therefor, of means for installing the windshield in an opening in the vehicle from the outside of the vehicle, said means comprising a flange on the opening having a first portion extending inwardly of the vehicle and a second portion extending radially inwardly of the opening from the first portion, a sealing ring having a radially inwardly facing groove engaging the periphery of the windshield and a radially outwardly facing groove displaced inwardly of the vehicle from the aforesaid groove and engaging the radially inwardly extending portion of the flange on the opening in the vehicle and being spaced from the first portion of the flange over a region extending from the outer side of the vehicle inwardly of the vehicle for at least a considerable part of the first portion of the flange, a plurality of channels having an outwardly directed tab on one side, an inwardly pressed bead on one side, and an inwardly directed portion struck out from the other side and fitting in spaced relation to one another in the space between the sealing ring and the first portion of the flange with the bases of the channels innermost and the tabs engaging the sealing ring, threaded fastenings applicable from the outside of the vehicle to engage the bases of the channels and to pass through the radially inwardly extending portion of the flange in the opening on the vehicle, and a covering ring overlapping the sealing ring and the opening in the vehicle outwardly of the flange and having spring fingers detachably engaging the beads and the struck-out portions of the channels.

10. The combination with an opening in a vehicle and a window therefor, of means for mounting the window in the opening, said means comprising a flange on the opening having a first portion extending inwardly of the vehicle and a second portion extending radially inwardly of the opening from the first portion, channels fitting between the window and the first portion of the flange with the bases innermost and engaging the outer side of the edge of the window, threaded fastenings installable from the outside of the vehicle so as to engage the bases of the channels and the second portion of the flange for retaining the channels in place, and a covering strip overlapping the edge of the window and detachably engaging the channels.

11. The combination with an opening in a vehicle and a window therefor, of means for mounting the window in the opening, said means comprising a flange on the opening having a first portion extending inwardly of the vehicle and a second portion extending radially inwardly of the opening from the first portion, means engaging the outer side of the edge of the window and including channels fitting between the window and the first portion of the flange with the bases innermost, threaded fastenings installable from the outside of the vehicle so as to engage the bases of the channels and the second portion of the flange for retaining the channels in place, and a covering strip overlapping the edge of the window and detachably engaging the channels.

12. The combination with an opening in a vehicle and a window therefor, of means for mounting the window in the opening, said means comprising a flange on the opening having a first portion extending inwardly of the vehicle and a second portion extending radially inwardly of the opening from the first portion, fastening means fitting between the first portion of the flange and the window and installable from the outside of the vehicle so as to engage the second portion of the flange by entering it for securing the window to the second portion of the flange and thereby holding the window in place, and a covering strip positioned so as to cover the edge of the window and detachably engaging the fastening means.

13. The combination with an opening in a vehicle and a window therefor, of means for mounting the window in the opening, said means comprising a flange on the opening having a first portion extending inwardly of the vehicle and a second portion extending radially inwardly of the opening from the first portion, a sealing ring engaging the periphery of the window, fastening means engaging said sealing ring and fitting between the first portion of the flange and the window and installable from the outside of the vehicle so as to engage the second portion of the flange by entering it for securing the window to the second portion of the flange and thereby holding the window in place, and a covering strip seated upon the outer surface of said sealing strip and secured to the fastening means.

ROBERT CADWALLADER.

REFERENCES CITED

The following references are of record in the file of this patent:

UNITED STATES PATENTS

| Number | Name | Date |
| --- | --- | --- |
| 2,070,676 | Northup | Feb. 16, 1937 |
| 2,261,038 | Sherts | Oct. 28, 1941 |